(12) United States Patent
Cerda Varela et al.

(10) Patent No.: US 11,592,008 B2
(45) Date of Patent: Feb. 28, 2023

(54) FLUID FILM BEARING AND WIND TURBINE

(71) Applicant: Siemens Gamesa Renewable Energy A/S, Brande (DK)

(72) Inventors: Alejandro Cerda Varela, Copenhagen East (DK); Niels Karl Frydendal, Herning (DK); Kim Thomsen, Skørping (DK); Morten Thorhauge, Ry (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 0 days.

(21) Appl. No.: 17/240,187

(22) Filed: Apr. 26, 2021

(65) Prior Publication Data

US 2021/0332802 A1    Oct. 28, 2021

(30) Foreign Application Priority Data

Apr. 28, 2020 (EP) .................................. 20171730

(51) Int. Cl.
*F03D 80/70* (2016.01)
*F03D 1/06* (2006.01)
*F03D 80/50* (2016.01)

(52) U.S. Cl.
CPC ........... *F03D 80/70* (2016.05); *F03D 1/0691* (2013.01); *F03D 80/50* (2016.05); *F05B 2230/21* (2013.01); *F05B 2240/54* (2013.01)

(58) Field of Classification Search
CPC ........ F03D 80/70; F03D 1/0691; F03D 80/50; F05B 2230/21; F05B 2240/54; Y02E 10/72; F16C 17/10; F16C 17/105; F16C 17/107; F16C 17/03; F16C 33/1075; F16C 2360/31; F16C 17/26; F16C 32/0666; F16C 32/0696; F16C 33/108; F16C 17/02; F16C 35/02; F16C 2237/00; F16C 17/028; F16C 32/0685
See application file for complete search history.

(56) References Cited

U.S. PATENT DOCUMENTS

2013/0287574 A1* 10/2013 Ebbesen ................. F03D 80/70
                                                                  416/170 R
2019/0195204 A1   6/2019 Mtauweg
2020/0040941 A1   2/2020 Luneburg et al.

FOREIGN PATENT DOCUMENTS

| EP | 2657519 A1 | 10/2013 |
| EP | 3276192 A1 | 1/2018 |
| WO | 2013034391 | 3/2013 |
| WO | 2018166660 A1 | 9/2018 |

OTHER PUBLICATIONS

European Search Report dated Oct. 21, 2020 for application No. 20171730.3.

* cited by examiner

*Primary Examiner* — Joseph Ortega
(74) *Attorney, Agent, or Firm* — Schmeiser, Olsen & Watts LLP

(57) ABSTRACT

Provided is a fluid film bearing, especially for a rotor hub in a wind turbine, including an inner part that supports a rotating outer part, wherein the inner part includes multiple radial pads distributed along the outer circumference of the inner part, each of the radial pads having at least one radial pad sliding surface, wherein the radial pad sliding surfaces support at least one outer part sliding surface of the outer part in the radial direction.

11 Claims, 8 Drawing Sheets

FLUID FILM BEARING AND WIND
TURBINE

CROSS-REFERENCE TO RELATED
APPLICATIONS

This application claims priority to EP Application No. 20171730.3, having a filing date of Apr. 28, 2020, the entire contents of which are hereby incorporated by reference.

FIELD OF TECHNOLOGY

The following relates to a fluid film bearing, especially for a rotor hub in a wind turbine, comprising an inner part that supports a rotating outer part. The following also concerns a wind turbine.

BACKGROUND

Wind turbines typically comprise a tower, a nacelle mounted on top of the tower and a rotor hub with mounted rotor blades that is rotatable with respect to the nacelle to generate power. The hub can be coupled to a gear box that drives a generator or the wind turbine can be a direct drive turbine. In the second case the hub directly drives the rotor of the generator. Especially in direct drive wind turbines it can be advantageous to use a rotor that is arranged outside the stator and that is directly coupled to the hub. In this case the arrangement of the rotor and the hub needs to be rotatably supported by at least one bearing.

The document WO 2013/034391 A2 discloses a direct-drive wind turbine using a single sliding bearing. In this bearing a multitude of closely spaced pads are mounted on a rotating outer ring of the bearing connected to the hub. The concave sliding surface of these pads slide on a sliding surface of an inner part. Details concerning pads that can be used in such an arrangement are e.g. disclosed in the document WO 2018/166660 A1.

Any kind of sliding bearing, especially sliding bearings for relatively heavy and strongly loaded parts, like the hub of a wind turbine, will cause a certain wear and tear of the sliding surfaces, especially of the pads. While this wear and tear can be reduced by using a fluid film bearing instead of a normal sliding bearing, a certain amount of wear and tear is still unavoidable, especially when a fluid-dynamic bearing is used, since the fluid film is only established in these bearings once a certain rotational speed is reached. This is especially true, since the pads typically have an acute angle on the edges of the sliding surfaces to ensure that their shape matches the sliding surface of the inner part. Generally, it is therefore necessary to exchange the pads of such a bearing in certain intervals.

Such an exchange can be problematic in the previously discussed bearing, since it is either necessary to access the pads from the outside of the hub or to provide a dedicated crawl space within the hub to access the pads.

SUMMARY

An aspect relates to provide a bearing that can allow easier access to the pads, especially when used as bearing for a hub in a wind turbine, and that can allow for a lower wear and tear.

This problem is solved by the initially discussed fluid film bearing, wherein the inner part comprises multiple radial pads distributed along the outer circumference of the inner part, each of the radial pads having at least one radial pad sliding surface, wherein the radial pad sliding surfaces support at least one outer part sliding surface of the outer part in the radial direction.

Using pads mounted to the inner part, that can especially be static, instead of the outer part, that can especially be rotatable, allows for an easier access to the pads, especially when the fluid film bearing is used in a wind turbine. In this case the inner part typically has the approximate shape of a tube in the area of the bearing. Therefore, the inner part forms a natural crawl space or even a larger access space for personal to access the wall of the inner part to which the pads can be mounted. As discussed in more detail below, the mounting of the pads on the inner part can also help to avoid acute angles at the circumferential ends of the radial pad sliding surfaces of the pad, which can also help to reduce wear and tear.

Pads used in bearings, e.g. the radial pads and optional axial pads that will be discussed below, typically comprise a contact part that forms the sliding surface of the pad and a support part used to mount the contact part to a mounting surface. The connection between the contact part and the support part typically allows the contact part to tilt in at least one direction to compensate for slight misalignments of the inner and outer part and for tolerances. The contact part can be connected to the support part e.g. by a pivot, a ball-in-socket connection or a flex support. Various approaches for providing such pads are known in the prior art and will therefore not be discussed in detail. It should be noted that in some cases only the contact part is considered to be the pad and the support part is considered to be the pad support. Since the connection between the contact part and the support part is not the focus of embodiments of the present invention and these parts can also be formed as a single piece, e.g. in the case of a flex support, the combination of these parts will simply be referred to as pad.

The radial pad sliding surface, the outer part sliding surface and other sliding surfaces discussed below can be coated to further reduce friction, e.g. with babbitt, white metal, a polymer or some other material. Different sliding surfaces can be coated with different material or the same material. It is also possible to leave some or all of the sliding surfaces without a coating or other surface treatment.

To allow for a smooth rotation of the inner and outer part with respect to each other all used sliding surfaces are essentially parallel to the circumferential direction of the bearing. Small angles of e.g. less than one degree between the surface of the respective sliding surface and the circumferential direction can appear due to tolerances during production, a misalignment of components, etc.

To provide support in the radial direction, the respective radial pad sliding surface and the outer part sliding surface supported by the radial pad sliding surfaces need to be arranged at an angle to the radial direction. A purely radial support is achieved by using sliding surfaces that are orthogonal to the radial direction. Tilting the sliding surfaces to certain degree in the axial direction, also referred to as a tapered sliding bearing, can allow for a combined radial and axial support. The radial pad sliding surfaces can e.g. be arranged at an angle of 30° to 60°, e.g. at an angle of approximately 45° to the radial direction. By choosing this angle the relative amount of radial and axial support can be adjusted. It should be noted, that the radial pad sliding surfaces can typically be tilted slightly, e.g. by less than 1° or 5°, due to the mounting of the contact part of the pad to the support part as discussed above.

The outer part can have multiple outer part sliding surfaces arranged at an angle to each other. Different radial pads, such as different groups of radial pads, can support different outer part sliding surfaces. It is also possible to use the radial pad only to support one or some of the outer part sliding surfaces and to use additional pads, especially the axial pads discussed below, to axially support of the outer part.

In a fluid film bearing lubricant needs to be provided to the contact area between the different sliding surfaces. Multiple approaches to this lubrication are known in the prior art and will not be discussed in detail. The lubrication can e.g., be a flooded lubrication, a direct lubrication, a lubrication by spray bar or some other kind of lubrication. Oil is used as lubricant in the fluid film bearing. The fluid film bearing may be a hydrodynamic bearing or alternatively a hydrostatic bearing. It is also possible to use a combination of these bearing types with some of the pads lubricated by a hydrodynamic lubrication and some of the pads lubricated by a hydrostatic lubrication. To avoid excess leakage of the lubricant, connections between different parts of the bearing are sealed. For simplicity's sake the sealing between the parts is not shown or discussed in the application, since implementations of such seals are well known in the prior art.

In a fluid film bearing the support of one sliding surface by another sliding surface involves an indirect transfer of forces, since a thin lubrication film is arranged between these surfaces. In some cases, e.g. at low rotational speeds in a hydrodynamic bearing or when pumps providing the lubricant are not running in a hydrostatic bearing, the respective sliding surfaces might be in direct contact and therefore the support might be achieved by a direct exchange of forces.

The radial pad sliding surface has a convex shape. When the sliding surfaces has a convex shape, a tangent on any point of the sliding surface does not intersect the sliding surface. Compared to pads having a convex shape of the sliding surface, e.g. to the pads of the previously discussed prior art, acute angles at the edges of the radial pad sliding surface are avoided, which can help to increase the lifetime of the pad.

The radial pad sliding surface can have the shape of a segment of a circle in a sectional plane orthogonal to the rotational axis of the bearing. This is true for each sectional plane orthogonal to the rotational axis that intersects the radial pad sliding surface. The direction of the rotational axis can also be called axial direction.

The outer part sliding surface can have a circular shape in the discussed sectional plane or planes, leading to similar shapes of both sliding surfaces and therefore an improved support.

In the case when the outer part has multiple outer part sliding surfaces, wherein at least one of the outer part sliding surfaces is supported by the radial pad sliding surfaces, the inner part can additionally comprise a first and a second group of axial pads distributed along the circumference of the inner part, each of the axial pads having an axial pad sliding surface, wherein the axial pad sliding surfaces of the axial pads of the first group axially supports a first one of the outer part sliding surfaces not supported by the radial pad sliding surfaces and wherein the axial pad sliding surfaces of the axial pads of the second group axially support a second one of the outer part sliding surfaces not supported by the radial pad sliding surfaces.

The use of additional axial pads can especially be advantageous when the outer part sliding surface supported by the radial pad sliding surfaces is approximately orthogonal to the radial direction, since the radial pad cannot provide an axial support or only provide very limited axial support in this case. At least part of the respective outer part sliding surface supported by the axial pad sliding surface of the respective group can be approximately orthogonal to the axial direction, e.g. arranged at an angle of at least 80° or at least 85° to the axial direction.

The two groups of axial pads support outer part sliding surfaces lying opposite to each other and/or facing in opposite directions, therefore providing axial support in both directions.

The outer part can form an annular protrusion extending in the radial direction towards the inner part, wherein the outer part sliding surfaces are formed on the radial end of the protrusion and on both axial ends of the protrusion, wherein the first group of the axial pads is arranged on one side of the protrusion and the second group of the axial pads is arranged on the opposite side of the protrusion in axial direction. In other words, the axial pad sliding surfaces support the protrusion from both sides therefore providing axial support in both directions. The outer part sliding surface formed on the radial end of the protrusion can be supported by the radial pad sliding surfaces.

The protrusion forms an outer ring of the bearing. The protrusion can especially have an I-shaped cross-section in a sectional plane orthogonal to the circumferential direction of the bearing.

Alternatively the outer part can form an annular outer section and two annular protrusions extending in the radial direction towards the inner part from the outer section, wherein the outer part sliding surfaces are formed on the annular outer section and the inner faces of the annular protrusions facing each other, wherein the first and second group of the axial pads are arranged between the annular protrusions.

The radial pad sliding surface can support the outer part sliding surface formed on the annular outer section. The axial pad sliding surfaces of a respective group of axial pads can support a respective outer part sliding surface arranged on a respective protrusion. Since the outer part sliding surfaces arranged on the protrusions face each other, axial support in both axial directions can be provided.

The outer section and the two protrusions can form the outer ring of a bearing having a U-shaped cross-section in a sectional plane orthogonal to the circumferential direction.

The radial pads are arranged at different circumferential positions than the axial pads. This can allow for a shorter bearing in the axial direction, since the axial pads need not to be placed next to the radial pads in the axial direction but can e.g. be placed at the same or a similar axial position and be displaced in the circumferential direction from the radial pads. The gained space in the axial direction can also be used to provide a larger radial pad sliding surface for each radial pad.

Since the axial pads and the radial pads can be placed in a similar position in the axial direction and can therefore be arranged along a line in the circumferential direction, this configuration can be considered to be an in-line configuration. Such a configuration can be combined with the previously discussed U-shaped and I-shaped outer ring.

In principle radial pads and axial pads could alternate in the circumferential direction. In wind turbine applications it can however be advantageous to use a relatively small number of radial pads, such that multiple axial pads or pairs of axial pads of different groups can be arranged between a pair of radial pads.

It is possible that all axial pads are arranged at different circumferential positions. Members of the first and second group of axial pads can alternate along the circumferential direction. This can be used to further shorten the bearing in the axial direction, especially when used in conjunction with a U-shaped outer ring of the bearing as the outer part as discussed above. In this case it is e.g., possible that the axial pads of the two groups are only slightly offset with respect to each other in the axial direction such that the distance between the two protrusions of the U-shaped ring needs to be only slightly larger than the extension of a single axial pad in the axial direction.

Each radial pad can have exactly one radial pad sliding surface, wherein the normal of the radial pad sliding surface can be tilted with respect to the radial direction, wherein the radial pad sliding surfaces of a first group of the radial pads can be facing towards a first axial end of the bearing, and wherein the radial pad sliding surfaces of a second group of the radial pads can be facing towards a second axial end of the bearing.

The normal of the radial pad sliding surface can be tilted by an angle of less than 90° and more than 0° by an angle between 30° and 60° e.g., by an angle of approximately 45°, with respect to the radial direction. By increasing the tilt angle, a stronger support by the pad in the axial direction is achieved while lowering the angle provides a stronger support in the radial direction. The tilting of the radial pads towards different ends of the bearing results in the radial pad sliding surfaces facing in different directions for different groups. Therefore, the two groups of radial pads provide axial support in both directions while still providing radial support.

The outer part can form an annular protrusion extending in the radial direction towards the inner part and forming two outer part sliding surfaces, wherein the normal of the outer part sliding surfaces is tilted with respect to the radial direction towards different ends of the bearing, wherein each of the outer part sliding surfaces is supported in the axial and radial direction by one of the groups of the radial pads, wherein the outer part sliding surfaces are facing each other or facing away from each other.

The protrusion can especially form an outer ring of the bearing that has a tapered I- or U-shaped cross-section in a sectional plane orthogonal to the circumferential direction. The outer part sliding surfaces can especially be arranged in a V-shape in this sectional plane either on the axial ends the protrusion, e.g. when a ring with a tapered I-shape is formed, or in a recess formed by the protrusion, e.g. when a ring with a tapered U-shape is formed.

The radial pads of the first group can be arranged at different circumferential positions than the radial pads of the second group. This can allow for a shorting of the bearing in the axial direction, especially when a tapered U-shape of an outer ring is used as discussed above, since pairs of radial pads of different groups, that provide axial support from both sides, do not need to be arranged at the same circumferential position and therefore at a different axial positions, but can be arranged inline along the circumference of the inner part.

The outer part can be formed, especially cast, as one piece and comprise a hub for a wind turbine. This can simplify the assembly of the wind turbine and potentially reduce the necessary amount of material and therefore especially the weight of the bearing and the hub. Alternatively, the outer part can be attached to a hub of a wind turbine e.g. by a flange connection.

An outer ring of the bearing, that can e.g. be formed by a protrusion of the outer part as discussed above, can be a forged steel ring that can e.g. be hardened to obtain a wear and damage resistance surface. Alternatively, it can be a cast iron ring that can be coated with a coating to obtain a wear and damage resistant surface. Other implementations are also possible.

The radial pads and/or the axial pads can be mounted to a main body of the inner part either by inserting the respective radial or axial pad between a support structure formed by the main body and the respective outer part sliding surface or by inserting the respective radial or axial pad into a respective opening of the main body that opens onto the respective outer part sliding surface and fixing a base plate or some other support structure supporting the respective pad to a backside of the main body facing away from the respective sliding surface. The proposed attachments for the pads allow for an easy servicing and/or exchange of the pads, especially when used in a wind turbine, and will be discussed in more detail later.

Embodiments of the invention also concern a wind turbine, comprising a rotor with a rotor hub what is connected to a further component of the wind turbine using a fluid film bearing according to embodiments of the present invention, wherein the hub is part of the outer part or mounted to the outer part of the fluid film bearing. The connection between the hub and the outer part is torque-proof. The connection between the inner part and the further component is also torque-proof. The further part can e.g., be a nacelle and/or a stator of a generator of the wind turbine. The outer part is also connected via a torque-proof connection to the rotor of the generator to provide a direct drive wind turbine or to the input stage of a gear box.

The hub can be connected to the further component by exactly one bearing. The discussed fluid film bearing is well suited as the only bearing used to support the hub of a wind turbine. Single bearing configurations can reduce the complexity and cost of a wind turbine. If multiple bearings are used, the fluid film bearing according to embodiments of the present invention can be used as the main bearing that is closest to the hub.

The hub and/or the inner part and/or the further component can form an interior space that allows personal to access the inner part, wherein the radial and/or the axial pads are mounted to a further component or to further components of the inner part in such a way that they can be exchanged by personal from within the inner space.

Concerning the mounting and an exchange of the pad two exemplary options will be discussed. In a first configuration the pad is shifted into its final position or removed from this position in a direction essentially parallel to the sliding surface of the respective pad. E.g. axial pads that have an axial pad sliding surface essentially orthogonal to the axial direction of the bearing can be exchanged by pulling the pad out in the radial direction or inserted by inserting the pad in the radial direction. Radial pads that essentially provide a purely radial support, e.g. pads that have a radial pad sliding surface that is essentially orthogonal to the radial direction can be placed in the final position or removed from this position in the axial direction. An advantage of this approach is that the respective pad can be inserted between a fixed support structure and the outer part sliding surface therefore forming a kind of sandwich in which the backside of the pad is supported by a fixed surface.

It can however also be advantageous to be able to remove or place at least some of the pads in a direction that is approximately orthogonal to the sliding surface of the respective pad. This can e.g. be achieved by providing an opening in a support structure carrying the pads that extends to the outer part sliding surface and inserting the pad into that opening and securing the pad in this opening by fixing a plate or some other support part of the pad to the material surrounding the opening. This can e.g. be useful to remove pads while a force from the outer part sliding surface is acting on the respective pad.

BRIEF DESCRIPTION

Some of the embodiments will be described in detail, with reference to the following figures, wherein like designations denote like members, wherein.

Figure 4:
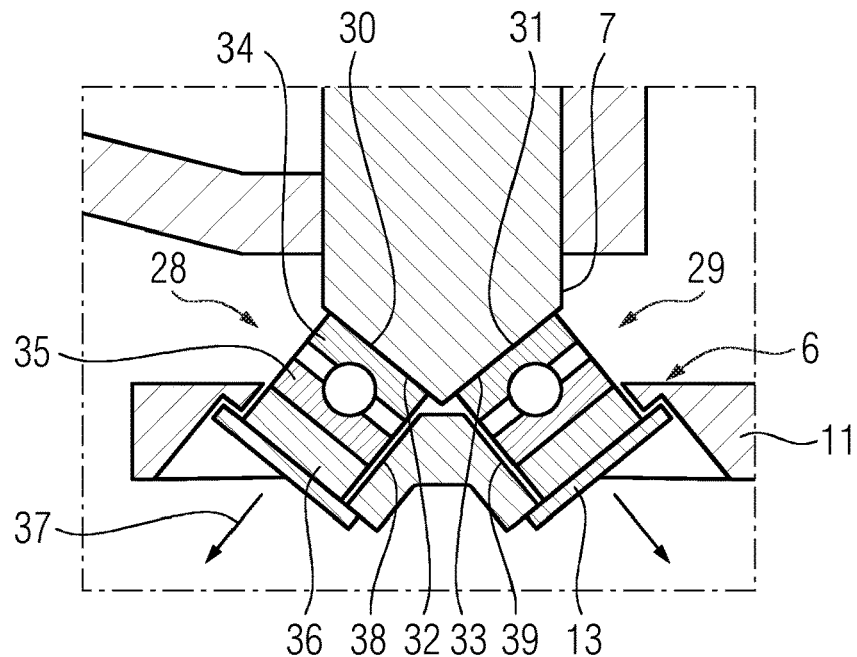
Figure 5:
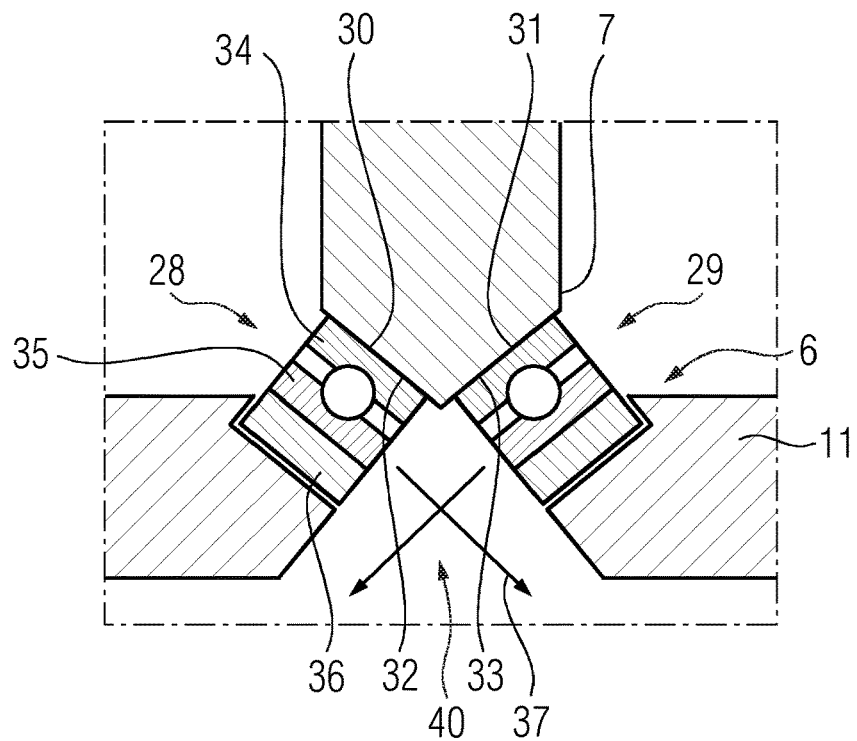
Figure 6:
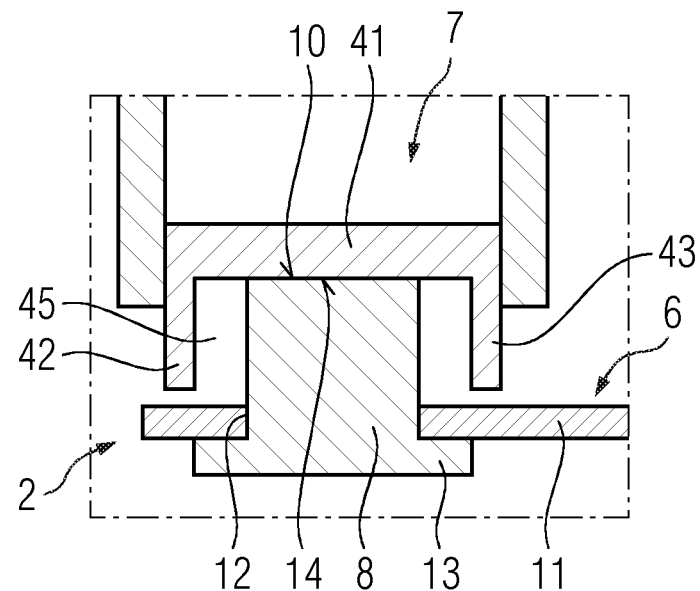
Figure 7:
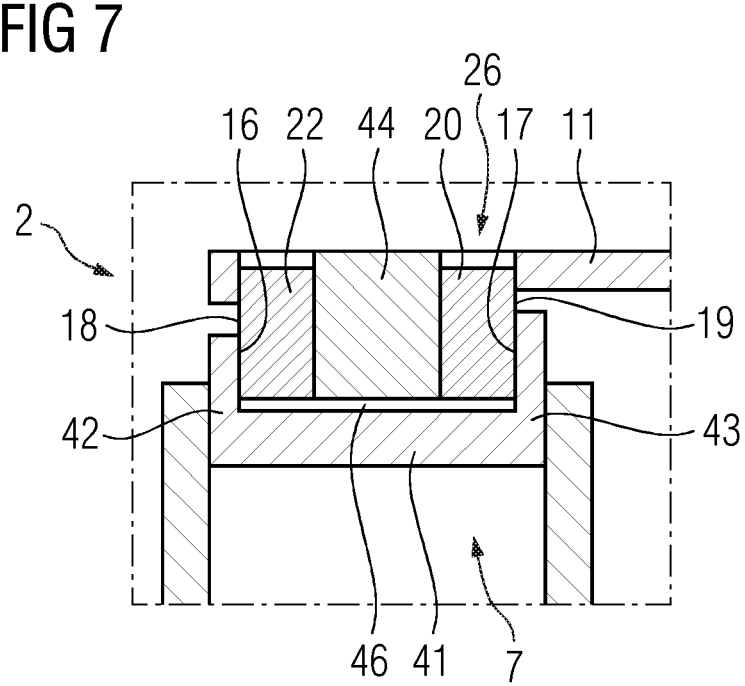
Figure 8:
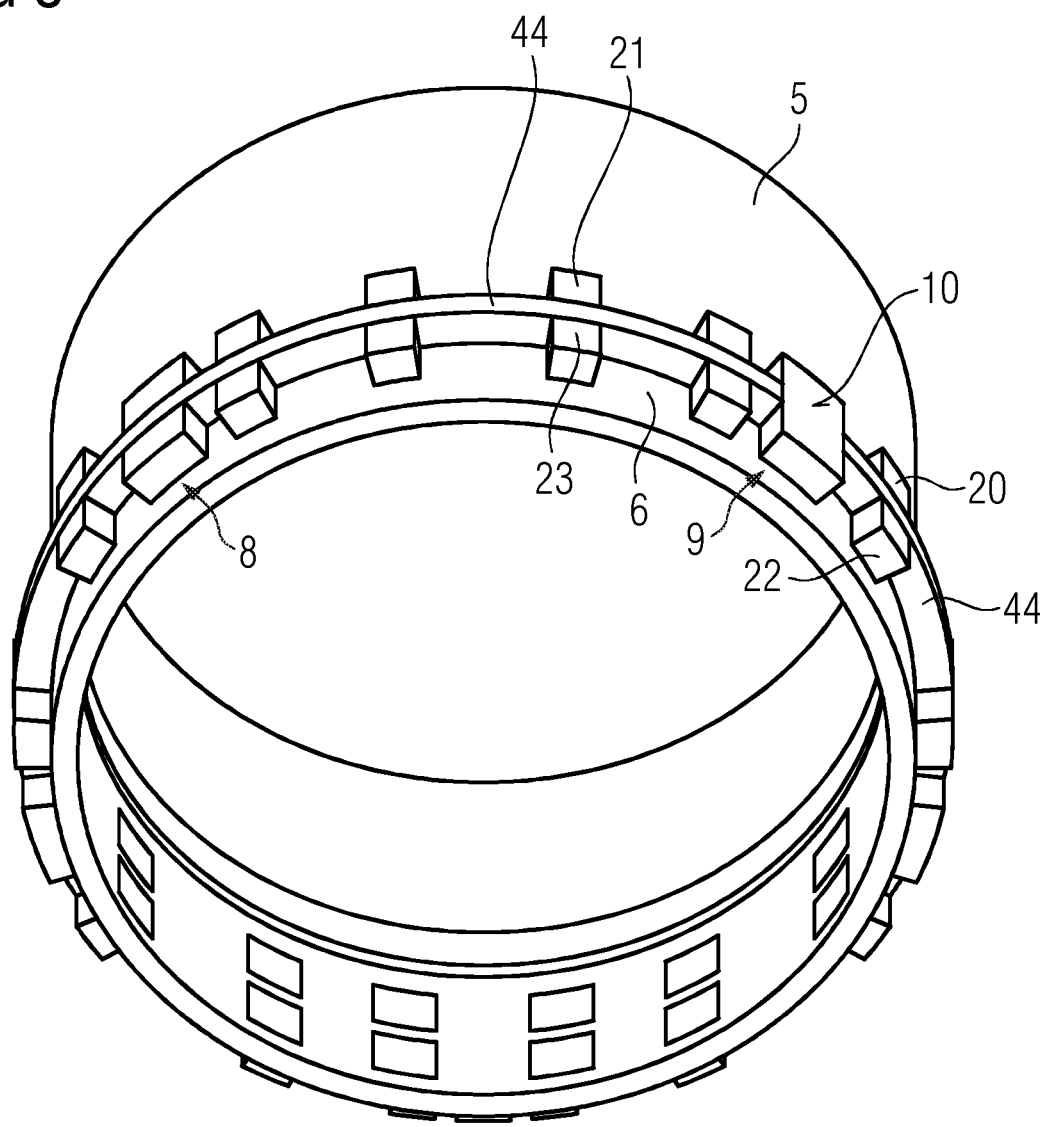
Figure 9:
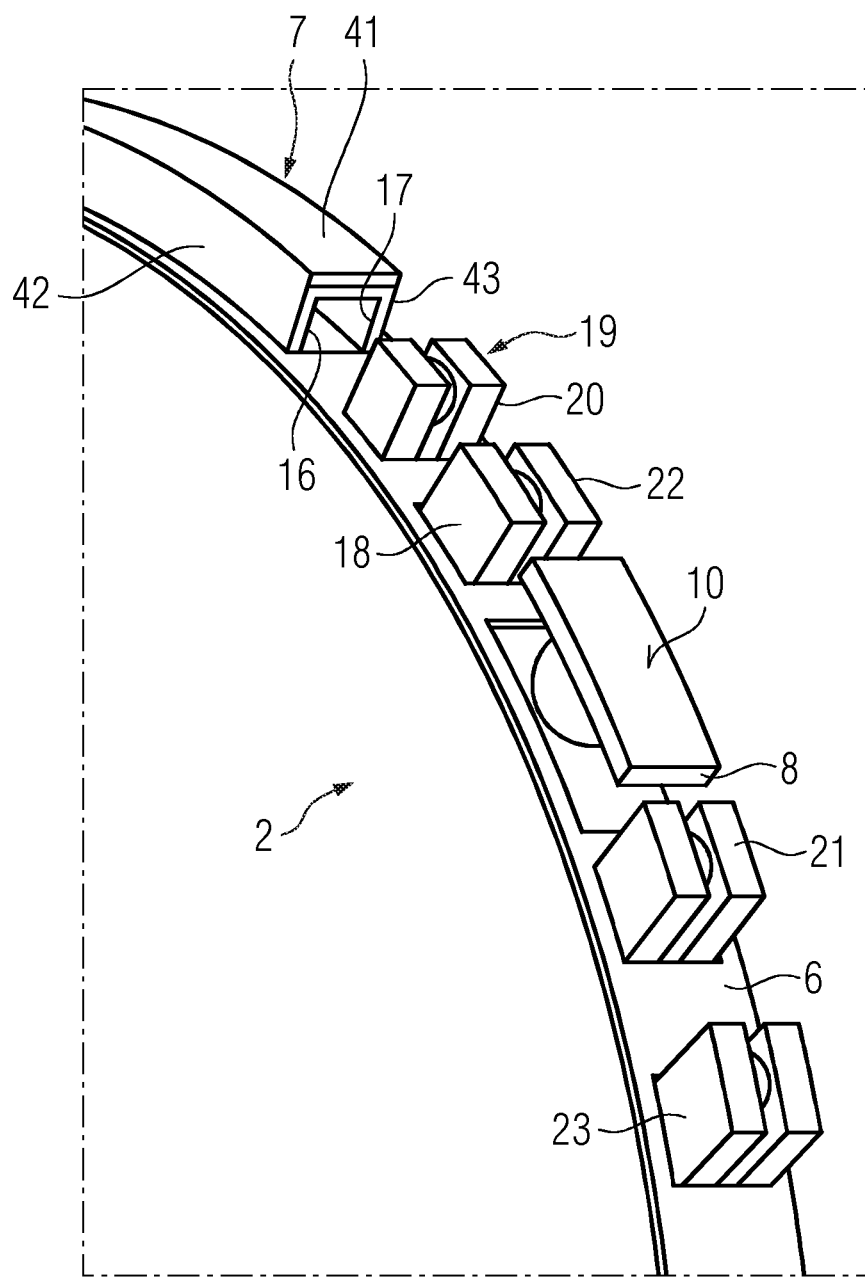
Figure 10:
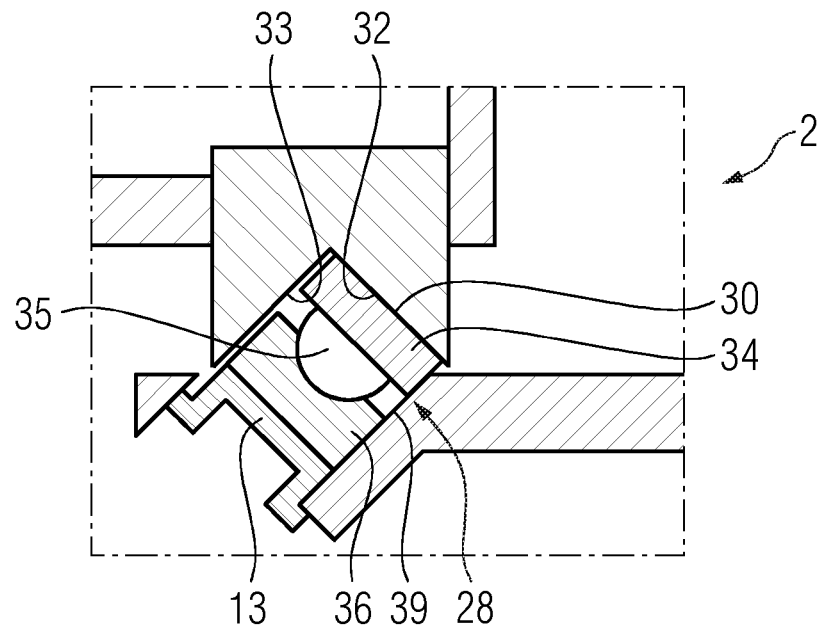
Figure 11:
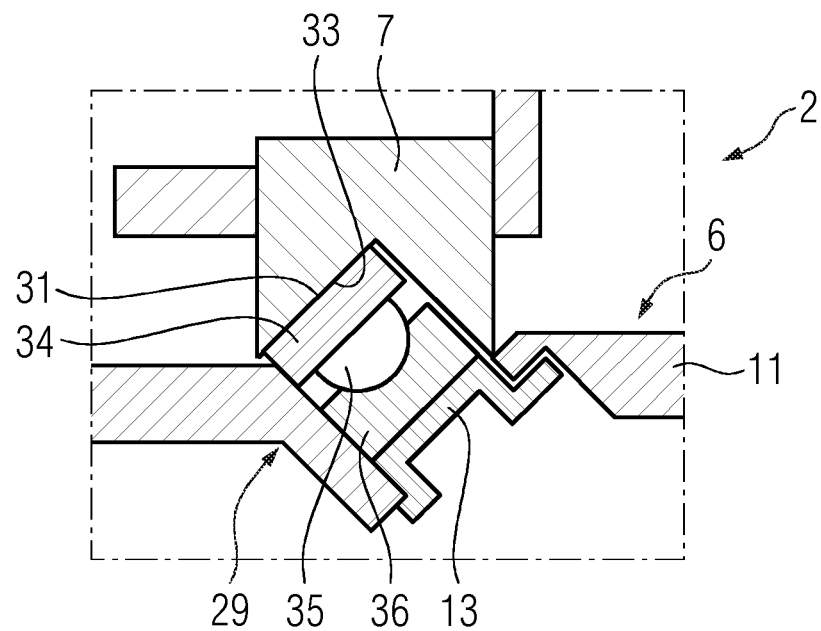
Figure 12:
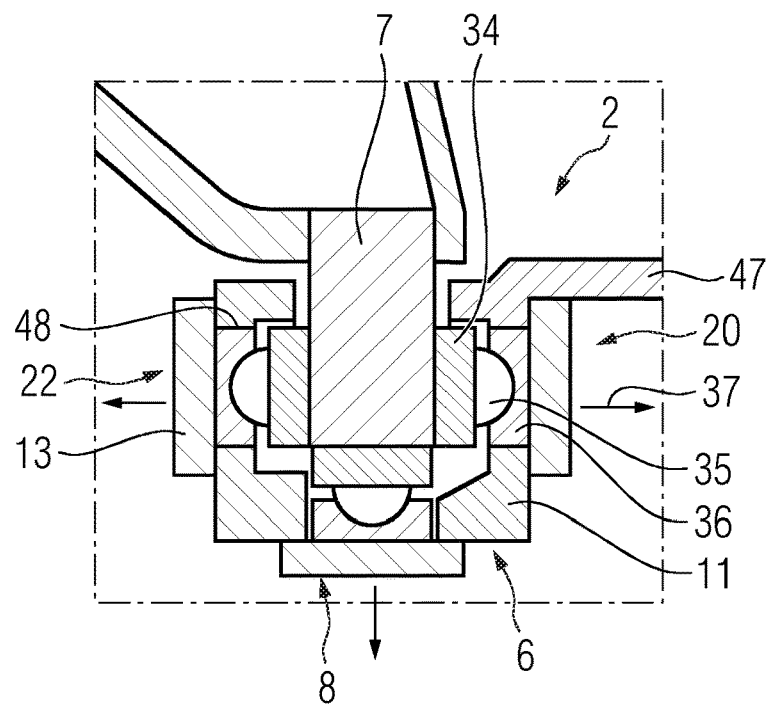
Figure 13:
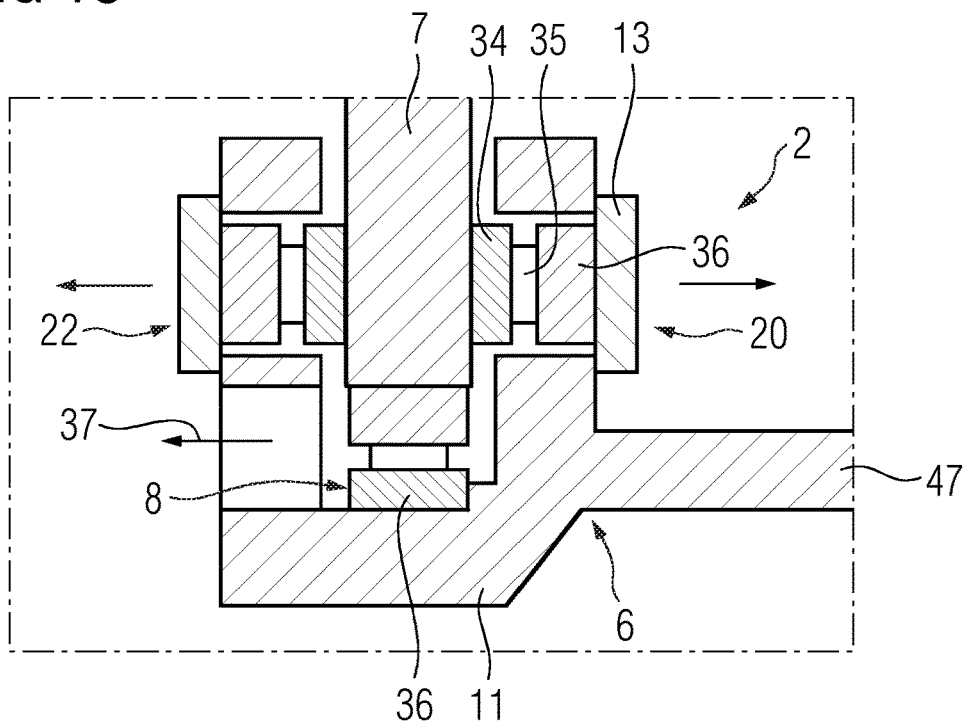

FIG. 4 details views of various further embodiments of a fluid film bearing according to the present invention that can be used in embodiments of a wind turbine according to the present invention;

FIG. 5 details how forces exerted by the outer part via the radial pad sliding surfaces are directly transferred to the main body of the inner part;

FIG. 6 shows an alternate embodiment that is similar to the embodiment discussed with reference to FIGS. 1-3 insofar as separate groups of pads are used for the radial and the axial support;

FIG. 7 shows an alternate embodiment that is similar to the embodiment discussed with reference to FIGS. 1-3 insofar as separate groups of pads are used for the radial and the axial support;

FIG. 8 shows an alternate embodiment that is similar to the embodiment discussed with reference to FIGS. 1-3 insofar as separate groups of pads are used for the radial and the axial support;

FIG. 9 shows an alternate embodiment that is similar to the embodiment discussed with reference to FIGS. 1-3 insofar as separate groups of pads are used for the radial and the axial support;

FIG. 10 shows a cross sections orthogonal to the circumferential direction of the bearing 2 at different circumferential positions;

FIG. 11 shows a cross sections orthogonal to the circumferential direction of the bearing 2 at different circumferential positions;

FIG. 12 shows a bearing similar to the bearing discussed with reference to FIGS. 1-3 with an approximately I-shaped outer part 7 supported by radial pads 8 and pairs of axial pads; and FIG. 13 shows a bearing similar to FIG. 12 but is a different mounting of the radial pad.

DETAILED DESCRIPTION

Figure 1:
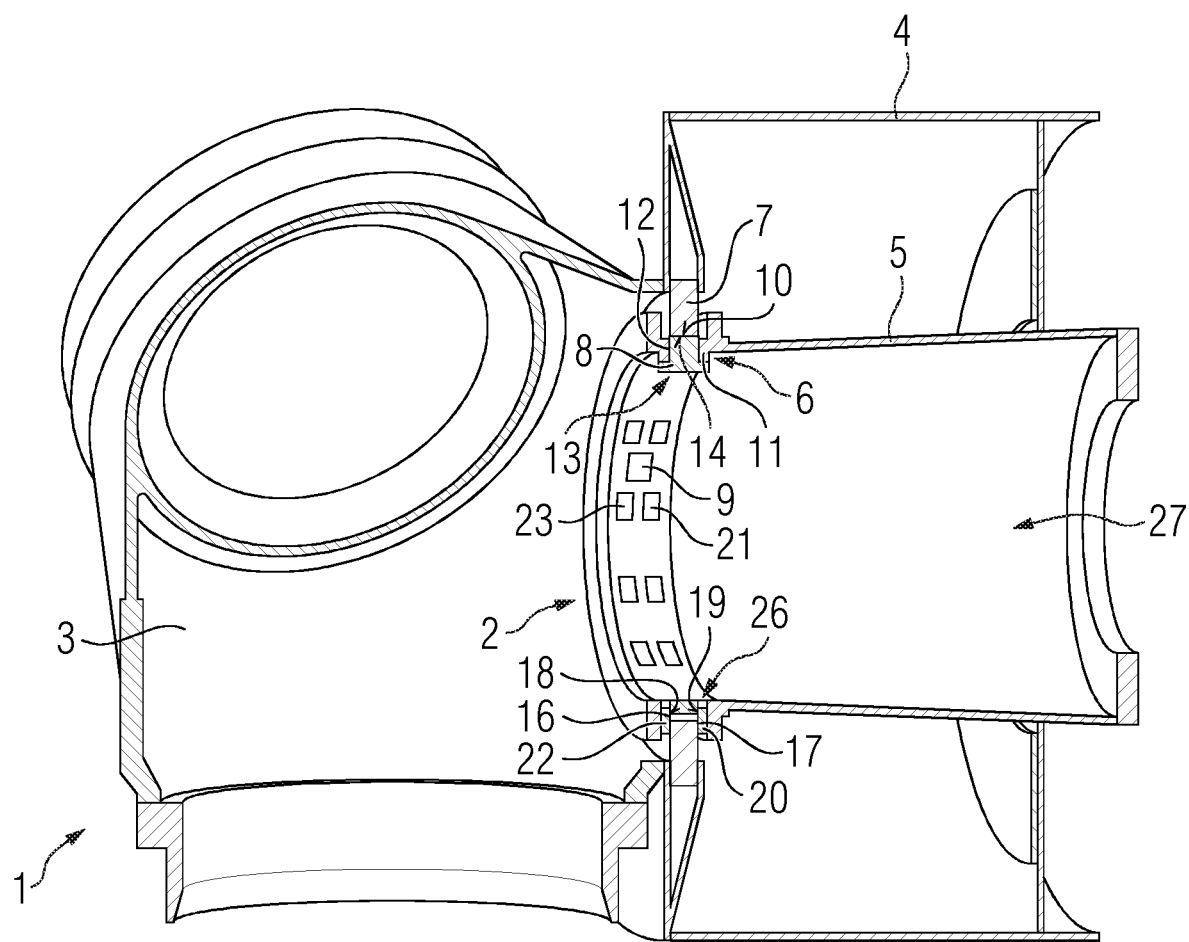
FIG. 1 shows an exemplary embodiment of a wind turbine according to the present invention comprising an exemplary embodiment of a fluid film bearing according to the present invention.

FIG. 1 shows a detailed view of a wind turbine 1 that comprises a rotor hub 3 rotatably connected to a further component 5 of the wind turbine 1 using a fluid film bearing 2. The hub 3 is mounted to an outer part 7 of the bearing 2 using a torque-proof connection. E.g. a flange connection can be used. Alternatively, the hub 3 and the outer part 7 could be formed, e.g. cast, as a single piece.

The outer part 7 is also connected to the structure 4 using a torque-proof connection. The structure 4 can be used to carry a rotor of a generator of the wind turbine 1 that is not shown in FIG. 1 for reasons of simplicity and clarity.

The inner part 6 of the bearing has an annular shape and can be formed as one piece with the further component 5 or connected to the further component 5 using a torque-proof connection. The further component 5 can especially be or carry the stator of the generator of the wind turbine 1 that is not shown for reasons of simplicity and clarity.

Since embodiments of the present invention focus on the implementation of the various sliding surfaces 10, 14 and 16-19, details concerning the lubrication of the fluid film bearing, e.g. seals and pumps that can optionally be used to transport the lubricant, are omitted in the figures.

To radially support the outer part 7, the inner part 6 comprises multiple radial pads 8, 9 distributed along the outer circumference of the inner part. In principle it would be possible to use an even distribution of the radial pads 8, 9 along the circumference. It can however be advantageous to use an uneven distribution, e.g. since the main load in the radial direction will typically be due to gravity acting on the hub 3.

Each of the radial pads 8, 9 has a respective radial pad sliding surface 10 that supports the outer part sliding surface 14 of the outer part 7 in the radial direction. The sliding surfaces 10, 14 can e.g. be coated to improve the robustness of the sliding surface and/or further reduce friction. While the sliding surfaces 10, 14 are typically not in direct contact during the normal operation, since a thin lubricant film is arranged between the sliding surfaces 10, 14, contact between the sliding surfaces 10, 14 can e.g. occur at slow rotating speeds or when pumps used to transport the lubricant are not working.

Figure 2:
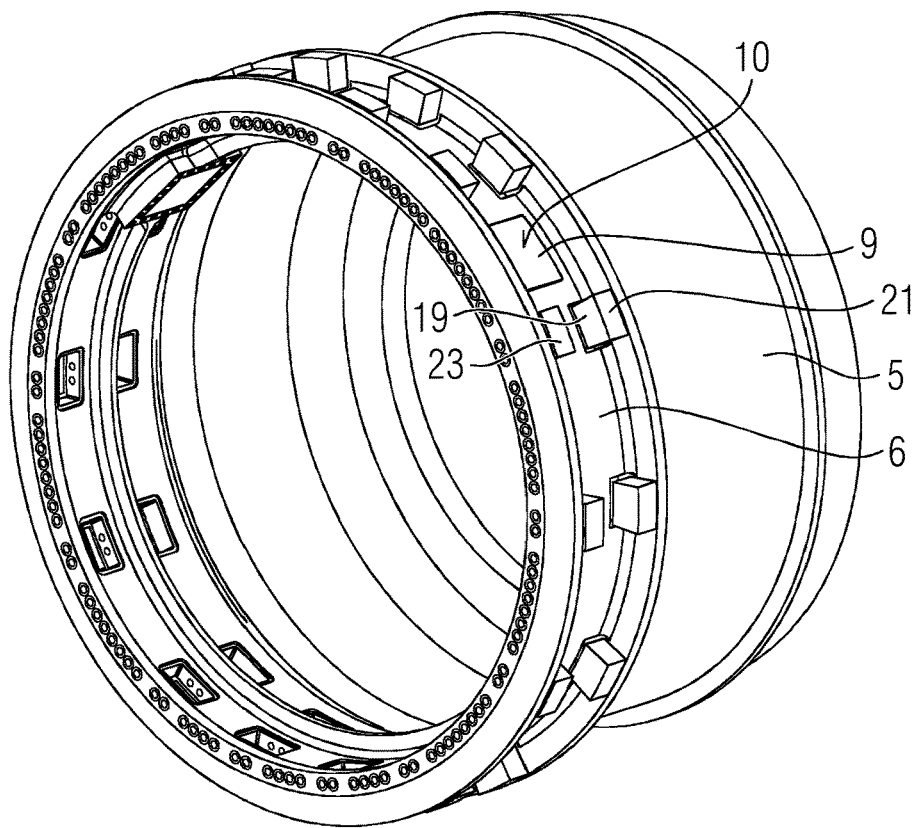
FIG. 2 shows a perspective view of the inner part of the bearing shown in FIG. 1.
Figure 3:
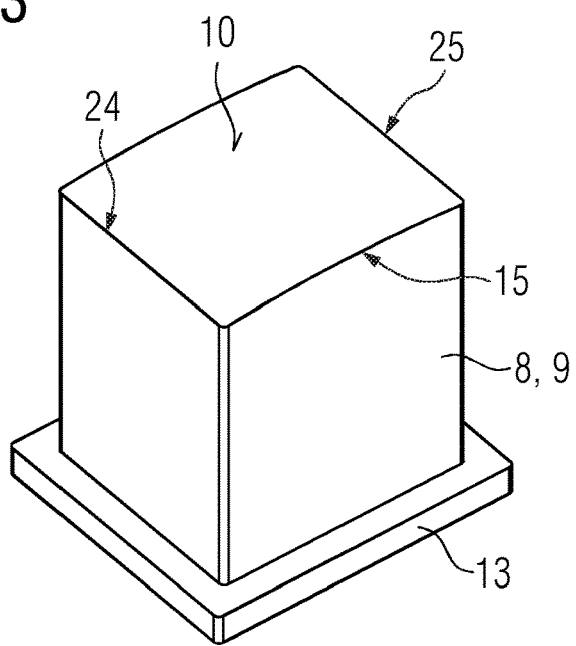
FIG. 3 shows the general shape of a radial pad used in the bearing shown in FIG. 1.

The radial pad sliding surface 10 does have a convex shape, as especially seen in FIGS. 2 and 3 that show the inner part 6 without the outer part 7 and a schematic illustration of the general shape of an individual radial pad 8, 9. As shown in FIG. 3 the radial pad sliding surface 10 at least approximates the shape of a segment 15 of a circle in a sectional plane orthogonal to the axial direction of the bearing. In FIG. 1 the axial direction coincides with the horizontal direction.

The convex shape of the radial pad sliding surface 10 closely matches the shape of the outer part sliding surface 14, that is at least approximately circular in the same sectional plane. Another advantage of using a convex surface is an avoidance of acute angles at the edges 24, 25 of the radial pad sliding surface 10. This can help to reduce wear and tear of the radial pad sliding surface 10 and the outer part sliding surface 14.

Concerning the general shape of the radial pad 8, 9 shown in FIG. 3 it should be noted that pads for a bearing and therefore also the radial pads 8, 9 and other pads that will be described later, typically allow a certain amount of tilting of the sliding surface of the respective pad with respect to a support part of the pad used to support the pad against a mounting surface or some other mounting point. The sliding surface is typically provided by a contact part that is mounted to the support part, e.g. by a pivot or a ball-in-socket connection. It is also possible to provide a flex support for the contact part. In this case the contact part and the support part can be formed from the same material connected by a thinner part of the same material to allow for a certain amount of flexing. While some of the later examples will show these distinct parts, in general the exact type of connection between the contact part and the support part is not essential for the discussed features of the radial pads 8, 9 and also the axial pads 20-23 that will be discussed later. Therefore, all pads 8, 9, 20-23 are shown as single blocks of material in FIGS. 1-3 and some of the later figures for simplicity's sake.

In the example discussed with reference to FIGS. 1-3 the radial pads 8, 9 are radially inserted into through holes 12 of a main body 11 of the inner part 6 of the bearing. They comprise a base plate 13 that can be screwed or bolted to the main body 11. Since the radial forces exerted on the radial pad sliding surface 10 have to be absorbed by the connection elements used to connect the base plate 13 to the main body 11, it is desirable to use a multitude of connection elements distributed around the circumference of the through hole 12, e.g. a multitude of screws or bolts.

In the discussed example the radial pad sliding surface 10 and the outer part sliding surface 14 are essentially orthogonal to the radial direction and can therefore only support the outer part 7 and therefore the hub 3 in the radial direction. To provide an axial support for the outer part 7 and therefore the hub 3, the outer part 7 has two additional sliding surfaces 16, 17 that are approximately orthogonal to the axial direction of the bearing 2. The outer part sliding surface 17 is supported by axial pad sliding surfaces 19 of a first group of axial pads 20, 21. The outer part sliding surface 16 is supported by axial pad sliding surfaces 18 formed by a second group of axial pads 22, 23. Therefore the outer part 7 is supported in both axial directions.

In the sectional plane orthogonal to the circumferential direction of the bearing shown in FIG. 1 the annular outer part 7 has approximately the shape of the letter "I" and forms a protrusion extending in the radial direction towards the inner part 6. The outer part sliding surface 14 is formed on the radial end of this protrusion and the outer part sliding surfaces 16, 17 are formed on the axial ends of this protrusion.

The axial pads 20-24 can be exchanged by radially removing or inserting them through through holes 26 of the main body 11 of the inner part 6, such that they are sandwiched between the main body 11 and the outer part 7. To allow for easy servicing of the radial pads 8, 9 and the axial pads 20-24 the hub and inner part and further component or a subgroup of these components can form an interior space 27 to allow personal to access the inner part 6. As previously discussed, the radial pads 8, 9 and axial pads 20-24 are both inserted radially into the main body 11 of the inner part 6 and are therefore easily accessible from such an interior space. As discussed later, e.g., with reference to FIGS. 12 and 13, other approaches for mounting the pads could also be used.

In the previously discussed example, the radial pad sliding surface 10 was essentially orthogonal to the radial direction. It was therefore necessary to use additional axial pads 20-23 to achieve an axial support of the outer part 7 and therefore the hub 3. FIG. 4 shows an alternative embodiment in which the outer part 7 has a tapered shape forming two outer part sliding surfaces 32, 33 that are essentially parallel to the circumferential direction of the bearing 2 but arranged at an angle to the radial and the axial direction of the bearing 2. By using a pair radial pads 28, 29, wherein the respective normal of the respective radial pad sliding surface 30, 31 is tilted with respect to the radial direction, the pair of radial pads 28, 29 is sufficient to provide radial and axial support at the same time. Multiple of these pairs of radial pads 28, 29 can be spaced along the circumference of the inner part 6.

To allow for easy servicing, the radial pads 28, 29 are mounted in through holes 38, 39 of the main body 11 of the inner part 6. As previously described a base plate 13 can be used to bolt, screw or otherwise attach the respective pad 28, 29 to the main body 11.

FIG. 4 also shows a more detailed structure of the individual pads 28, 29. Each of the pads 28, 29 comprise a support part 36 that comprises the base plate 13 for fixing the respective pad 28, 29 to the main body 11. The respective sliding surface 30, 31 is provided by a respective contact part 34, that can e.g. be coated to provide the respective sliding surface 30, 31. The connecting section 35 that connects the contact section 34 and the support section 36 can e.g. implement a ball-in-socket connection or some other means to allow a slight tilting of the respective radial pad sliding surface 30, 31. The radial pads 28, 29 can easily be serviced by removing them as shown by the arrows 37, e.g. from within an interior space 27 shown in FIG. 1.

A slight variation of the previously discussed embodiment is shown in FIG. 5. Since most features are identical to the embodiment shown in FIG. 4 the same labels are used for the different components. The main difference between these embodiments is the mounting of the pads 28, 29 to the main body 11 of the inner part 6. While the embodiment discussed with reference to FIG. 4 allows for an especially easy removal of the pads 28, 29, since they can even be removed when loaded by a force from the outer part via the pad sliding surfaces 30, 31, the drawback of this embodiment is that the fixing means, with which the respective base plate 13 is fixed to the main body 11, need to support the pads 28, 29 against any forces exerted by the outer part 7 onto the radial pad sliding surfaces 30, 31.

When the embodiment shown in FIG. 5 is used, forces exerted by the outer part 7 via the radial pad sliding surfaces 30, 31 are directly transferred to the main body 11 of the inner part 6. In this case the pads 28, 29 cannot be moved parallel to the axis of the support. Instead, they are removed orthogonal to this axis as shown by the arrows 37 in FIG. 5. The pads 28, 29 can e.g., be accessed by a common opening 40 from the interior space 27 shown in FIG. 1.

FIGS. 6, 7 and 8 show an alternate embodiment that is similar to the embodiment discussed with reference to FIGS. 1-3 insofar as separate groups of pads are used for the radial and the axial support. The main difference between these embodiments is the shape of the outer part 7. While the outer part 7 has an I-shape in a sectional plane orthogonal to the circumferential direction of the bearing 2 in the embodiment of FIGS. 1 to 3, the embodiment according to FIGS. 6-8 uses an outer part 7 with a U-shape in such a sectional plane that is formed by an annular outer section 41 and two protrusions 42, 43 extending from this annular outer section 41 towards the inner part 6, as shown in FIGS. 6 and 7.

Like in the previously discussed embodiment, the radial pads 8, 9 that provide a radial support and the axial pads 20-23 that provide an axial support to the outer part 7 are provided in different positions along the circumferential direction of the bearing 2. This is e.g., obvious from FIG. 8 that shows a perspective view of the inner part 6. Therefore FIGS. 6 and 7 show cross sections of the bearing 2 at different positions along the circumference of the bearing 2 to show the interaction of the radial pad 8 and the axial pads 20, 22 with the outer part 7.

As shown in FIG. 6 the outer part sliding surface 14 is formed by the annular outer section 41. The radial pad 8 is mounted essentially in the same way to a main body 11 of the inner part 6 as in the previously discussed embodiment. Since there is a relatively large gap 45 between the protrusions 42, 43 and the radial pad 8, only the radial pad sling surface 14 interacts with the outer part 7.

As shown in FIG. 7, the axial pads 20, 22 are sandwiched between a support ring 44 formed by the main body 11 of the inner part 6 and respective protrusion 42, 43 of the outer part 7. Since there is a sufficiently large gap 46 between the axial pads 20, 22 and the annular outer section 41 of the outer part 7, the axial pads 20, 22 only interact with the protrusions 42, 43 to axially support the outer part 7. A respective axial pad sliding surface 18, 19 supports the respective outer part sliding surface 16, 17. The axial outer part sliding surfaces 16, 17 in FIG. 7 face each other while the outer part sliding surfaces 16, 17 providing the same functionality in the embodiment according to the FIGS. 1-3 face away from each other.

FIG. 9 shows a variation of the embodiment discussed with reference to FIGS. 6-8. Only a small circumferential section of the bearing 2 is shown, wherein part of the outer part 7 is cut away to show the arrangement of the axial pads 20-22 and one of the radial pad sliding surfaces 10. To improve clarity, the different pads 20-22 are shown in a bit more detail and not simply as the outline as in the previous example.

The main difference between the embodiment according to FIG. 9 and the previously discussed embodiment is the arrangement of the different axial pads 20-22. In the previous embodiment two axial pads 20, 22 are arranged at a respective circumferential position, both of these axial pads 20, 22 being supported by the support ring 44. The embodiment according to FIG. 9 instead places all of the axial pads 20-22 in different circumferential positions. Therefore, a first group of axial pads 20, 21 whose axial pad sliding surfaces 19 support the outer part sliding surface 17 are placed in different circumferential positions than the axial pads 22, 23 of a second group, whose axial pad sliding surfaces 18 support the outer part sliding surface 16 that is hidden by the protrusion 42 in FIG. 9. Using only a single axial pad 20-22 in each circumferential position can reduce the width of the bearing which can be advantageous in some cases.

A similar reduction in the width of the bearing 2 can be achieved for the embodiment previously discussed with reference to FIGS. 4 and 5 that uses two outer part sliding surfaces 32, 33 that are both arranged at an angle to the radial and to the axial direction, therefore supporting the outer part 7 in the axial and in the radial direction. Such an embodiment is now described with reference to FIGS. 10 and 11 that show cross sections orthogonal to the circumferential direction of the bearing 2 at different circumferential positions. Since the approach to supporting the outer part 7 is similar as in FIGS. 4 and 5, the same reference numbers are used for components serving the same or similar purposes.

The first difference to the embodiment shown in FIGS. 4 and 5 is the shape of the outer part 7. Instead of the tapered I-shape shown in FIGS. 4 and 5, the outer part 7 now has a tapered U-shape with two protrusions with tapered ends forming the two outer part sliding surfaces 32, 33. Therefore the outer part sliding surfaces 32, 33 face each other in the embodiment according to FIGS. 10 and 11.

Due to this arrangement of the outer part sliding surfaces 32, 33 the two radial pads 28, 29 cannot be placed in the same position in the circumferential direction of the bearing 2. Instead, they are displaced by a certain distance in the circumferential direction. The radial pads are arranged in such a way that pads shown with the orientation in FIG. 10 and pads shown with the orientation shown in FIG. 11 alternate.

FIG. 12 shows a further variation of the discussed fluid film bearing 2. The overall design of the bearing is similar to the bearing discussed with reference to FIGS. 1-3 with an approximately I-shaped outer part 7 supported by radial pads 8 and pairs of axial pads 20, 22. In the example shown in FIG. 12 the axial pads 20, 22 and the radial pads 8 are arranged at the same circumferential position. It would be also possible to use different circumferential positions for the radial pads 8 and the axial pads 20, 22 and/or to place the axial pads 20, 22 for the different directions of axial support at different circumferential positions.

The main difference between the embodiment discussed with reference at the FIGS. 1-3 and the embodiment according to FIG. 12 is the way that axial pads 20, 22 are mounted to the main body 11 of the inner part 6. Instead of radially inserting them between the outer part 7 and the main body 11, they are inserted into axial openings 48 of the main body 11 and attached to the main body 11 via a base plate 13 that extends over the opening, e.g., by screwing or bolting the base plate 13 to the main body 11. This approach was already discussed with reference to the radial pads 8 with reference to FIG. 1.

The inner part 6 is connected to the further component 5 via a connection 47 that lies outside of the axial pad 20, therefore allowing a removal of the radial pad 8 as well as of the axial pads 20, 22 in the respective directions indicated by the arrows 37 from an interior space 27 as discussed with reference to FIG. 1.

A further variant of the bearing 2 is shown in FIG. 13. The main difference to the bearing 2 shown in FIG. 12 is a different mounting of the radial pad 8. Instead of attaching the radial pad by a base plate 13, the support section 36 of the radial pad 8 is directly supported by the main body 11 of the inner part 6. This can be advantageous when it is expected that the radial pad 8 will be strongly loaded, since these strong loads would have to be supported by screws or bolts fixing the base plate 13 to the main body 11 otherwise.

Another difference to the embodiment according to FIG. 12 is the placement of a connection 47 to the further part 5. In the embodiment shown in FIG. 13 the axial pad 20 therefore lies outside of the interior space 27 formed by the further part 5 and the bearing 2. While such an arrangement can make an exchange of the axial pad 20 more cumbersome, it can be advantageous in some cases, e.g., when a small diameter of the further part 5 is required.

Obviously, the features discussed with respect to the individual embodiments can be combined in the variety of ways. Also, the connection of the inner and outer part to various other parts of the wind turbine 1 can be varied. It is e.g. possible to form the outer part 7 as one piece with the hub and/or the structure 4 or to connect the outer part 7 to one or both of these pieces by a different connection, e.g. by a flange connection. Correspondingly it is possible to provide the further part 5 and the inner part 6 as one piece or to connect them by a flange, etc.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A fluid film bearing, comprising an inner part that supports a rotating outer part, wherein the inner part comprises multiple radial pads distributed along the outer circumference of the inner part, each of the radial pads having at least one radial pad sliding surface, wherein the outer part has multiple outer part sliding surfaces, wherein the radial pad sliding surfaces support at least one of the outer part sliding surfaces of the outer part in the radial direction, wherein the inner part additionally comprises a first and a second group of axial pads distributed along the circumference of the inner part, each of the axial pads having an axial pad sliding surface, wherein the axial pad sliding surfaces of the axial pads of the first group axially support a first one of the outer part sliding surfaces not supported by the radial pad sliding surfaces and wherein the axial pad sliding surfaces of the axial pads of the second group axially support a second one of the outer part sliding surfaces not supported by the radial pad sliding surfaces, wherein the outer part forms an annular outer section and two annular protrusions extending in the radial direction toward the inner part from the outer section, wherein the outer part sliding surfaces are formed on the annular outer section and the inner faces of the annular protrusions facing each other, wherein the first and second group of the axial pads are arranged between the annular protrusions.

2. The fluid film bearing according to claim 1, wherein the radial pad sliding surface has a convex shape.

3. The fluid film bearing according to claim 1, wherein the radial pads are arranged at different circumferential positions than the axial pads.

4. The fluid film bearing according to claim 1, wherein all axial pads are arranged at different circumferential positions.

5. The fluid film bearing according to claim 1, wherein the outer part is formed, wherein the out part is cast, as one piece and comprises a hub for a wind turbine.

6. The fluid film bearing according to claim 1, wherein the radial pads and/or the axial pads are mounted to a main body of the inner part either by inserting a respective radial or axial pad between a support structure formed by the main body and a respective outer part sliding surface or by inserting the respective radial or axial pad into a respective opening of the main body that opens onto the respective outer part sliding surface and fixing a base plate or some other support structure supporting the respective pad to a backside of the main body facing away from the respective sliding surface.

7. A wind turbine, comprising a rotor with a rotor hub that is connected to a further component of the wind turbine using a fluid film bearing according to claim 1, wherein the hub is part of the outer part or mounted to the outer part of the fluid film bearing.

8. The wind turbine according to claim 7, wherein the hub is connected to the further component by exactly one bearing.

9. The wind turbine according to claim 7, wherein the hub and/or the inner part and/or the further component form an interior space that allows personal to access the inner part, wherein the radial and/or the axial pads are mounted to a further component or further components of the inner part in such a way that they are exchanged by personal from within the inner space.

10. A fluid film bearing, comprising an inner part that supports a rotating outer part, wherein the inner part comprises multiple radial pads distributed along the outer circumference of the inner part, each of the radial pads having at least one radial pad sliding surface, wherein the outer part has multiple outer part sliding surfaces, wherein the radial pad sliding surfaces support at least one of the outer part sliding surfaces of the outer part in the radial direction, wherein each radial pad has exactly one radial pad sliding surface, wherein the normal of the radial pad sliding surface is tilted with respect to the radial direction, wherein the radial pad sliding surfaces of a first group of the radial pads are facing towards a first axial end of the bearing, and wherein the radial pad sliding surfaces of a second group of the radial pads are facing towards a second axial end of the bearing, wherein the outer part forms an annular protrusion extending in the radial direction toward the inner part and forming two outer part sliding surfaces, wherein the normal of the outer part sliding surfaces is tilted with respect to the radial direction toward different ends of the bearing, wherein each of the outer part sliding surfaces is supported in the axial and radial direction by one of the groups of the radial pads, wherein the outer part sliding surfaces are facing each other or facing away from each other.

11. The fluid film bearing according to claim 10, wherein the radial pads of the first group are arranged at different circumferential positions than the radial pads of the second group.

* * * * *